United States Patent
Li et al.

(10) Patent No.: US 6,433,819 B1
(45) Date of Patent: Aug. 13, 2002

(54) DETECTION OF GAUSSIAN NOISE IN VIDEO SIGNALS

(75) Inventors: Bei Li, Beaverton; Bozidar Janko, Portland, both of OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/457,411

(22) Filed: Dec. 7, 1999

(51) Int. Cl.7 .............................................. H04N 17/00
(52) U.S. Cl. ....................................... 348/180; 348/192
(58) Field of Search .................................. 348/180, 192, 348/607, 615, 618, 200; 382/224, 228, 260, 262, 274, 275

(56) References Cited

U.S. PATENT DOCUMENTS

| | | | |
|---|---|---|---|
| 5,473,384 A | * 12/1995 | Jayant et al. | 348/470 |
| 5,488,421 A | * 1/1996 | Hwang et al. | 348/448 |
| 5,799,117 A | * 8/1998 | Guissin | 382/254 |

* cited by examiner

*Primary Examiner*—Victor R. Kostak
(74) *Attorney, Agent, or Firm*—Francis I. Gray

(57) ABSTRACT

A method and apparatus for the detection of Gaussian noise in a video signal decomposes an image from the video signal to obtain best qualified blocks having a relatively uniform luminance. From the best qualified blocks an average standard deviation is calculated, and then smoothed by temporal filtering. The filtered average standard deviation is finally calibrated against a scale of corresponding input noise levels to obtain the Gaussian noise in the video signal.

4 Claims, 2 Drawing Sheets

ATTACHMENT 1

ATTACHMENT 1

DETECTION OF GAUSSIAN NOISE IN VIDEO SIGNALS

BACKGROUND OF THE INVENTION

The present invention relates to the detection of artifacts in a video signal, and more particularly to the detection of Gaussian noise in video signals.

There are known methods of measuring Gaussian noise in video signals. One such method measures the noise as the amount of fluctuations in known flat parts of analog video waveforms. This method works, but it is not pertinent where such noise occurs in video chains that have both analog and digital/compression links. Particularly in that the flat portions of the video waveform outside the active video area may be lost in subsequent digitization and/or compression processing.

Another method is to deduce the amount of noise from the active video area by measuring the statistics of properties of picture edges from an edge histogram. This method works for high amount of Gaussian noise in video signals, but it does not work well when lower, but nevertheless perceivable, amounts of noise are contained in the video signal.

What is desired is a method and apparatus for the detection of Gaussian noise in the active video area of video signals.

BRIEF SUMMARY OF THE PRESENT INVENTION

Accordingly the present invention provides a method and apparatus for the detection of Gaussian noise in a video signal by decomposing an image from the video signal into best qualified blocks of relatively uniform luminance. An average standard deviation is calculated for the best qualified blocks, and then smoothed by temporal filtering over other images from the video signal. The filtered average standard deviation is calibrated against a scale of corresponding input noise levels to obtain the Gaussian noise in the video signal.

The objects, advantages and other novel features of the present invention are apparent from the following detailed description when read in conjunction with the appended claims and attached drawing.

DETAILED DESCRIPTION OF THE INVENTION

The measurement of Gaussian noise in video signals analyzes the active video area or content in the video signals. The measurement is based on the presumption that the Gaussian noise added to the video signal is distributed homogeneously over the active video area. Also assumed is that there are "flat" or "uniform" portions in the active video areas representing pictures that make up the program content. In other words there are parts of a luminance bit-map that are of relatively constant amplitude. These flat portions may vary in size and may occur in different places in the active video area, depending upon the video content and noise level. For typical video programming the situations where these assumptions are met are extremely rare.

Figure 2:
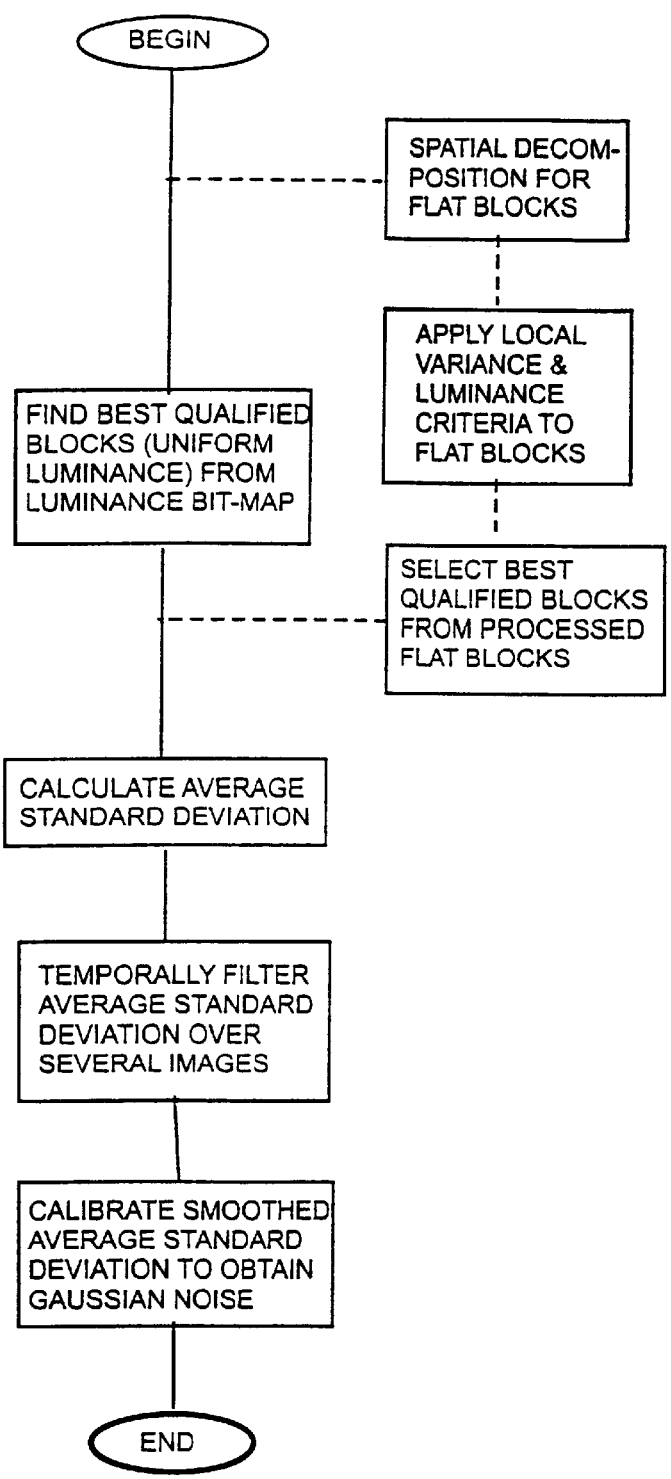
Fig. 2 is a flow chart view for the detection of Gaussian noise in video signals according to the present invention.

Referring now to FIG. 2 the proposed solution has four major steps:

1. Find the best qualified uniform image block(s);
2. Calculate the average variance and standard deviation of these best qualified image block(s);
3. Expand the model into the spatial domain by applying a temporal filter to get more meaningful results; and
4. Calibrate output numbers into a scale of corresponding input noise levels.

1. Finding the Best Qualified Uniform Image Block(s)

Subject a luminance bit-map to a spatial decomposition to find qualified flat blocks. The decomposition stops once a significant number of flat blocks are found. The sizes of the flat blocks may be different, depending upon the context of the image in the current field/frame of the video signal and the noise level. The size of the blocks needs to be big enough to be representative. From experimental data at least one 32×32 block or a group of blocks of equivalent size are required to produce accurate detection results.

For the pool of qualified blocks apply the following criteria to find the best qualified blocks for further computation: local variance criterion and local luminance criterion. According to the local variance criterion for each image block the smaller the luminance variance is, the less content the block has and the more accurate the variance is as an indication of Gaussian noise magnitude. Therefore blocks with lower variance are chosen first. According to the local luminance criterion if the local luminance of a block is too low (<10) or too high (>240), the noise is probably clamped. Detected noise from such an image block does not accurately represent the noise level of the whole image.

From the above selected blocks a smaller candidate set of blocks is chosen. The overall size of the group of blocks chosen, or the size of one block, should always be no smaller than the specified minimum (32×32 pixels square). For example if a group of 4×4 image blocks are chosen, the number of 4×4 blocks should be no fewer than 64 to be equivalent to one 32×32 block.

2. Calculating the Average Standard Deviation

The standard deviation of a uniform block is a good measure of global noise. Therefore calculate the variances, and thus standard deviations, of the uniform image blocks from the best qualified blocks. The one signal number that indicates the noise level for the field/frame is obtained by averaging all standard deviation values.

3. Temporal Filtering

Figure 1A:
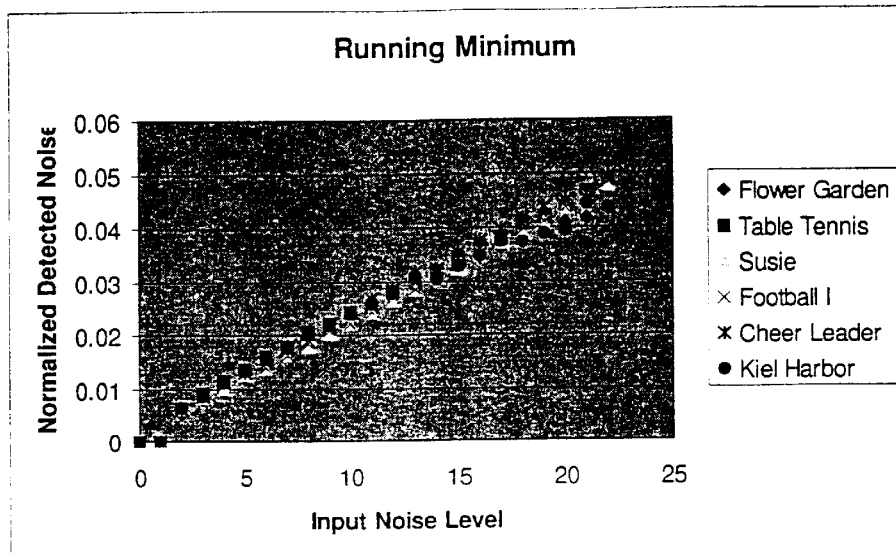
FIGS. 1A and 1B are graphic views of (a) a running minimum and (b) a running average for smoothing the average standard deviation according to the present invention.
Figure 1B:
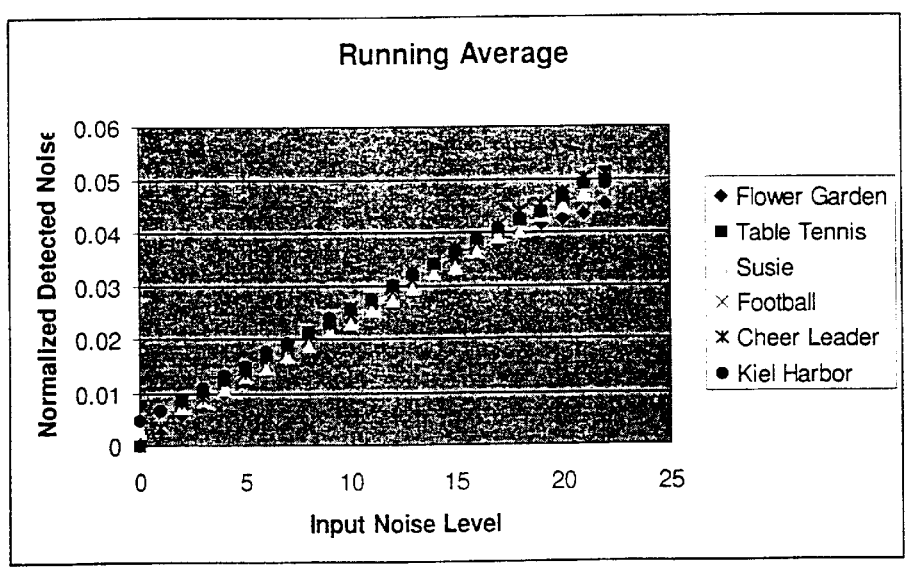

Temporal filtering accounts for the temporal coherency of a video sequence. A running minimum or running average is obtained to smooth the average standard deviations for the fields/frames of the video signal. In this way abnormal measurement errors, which are inevitable in single-ended measurements like this, are minimized. FIGS. 1A and 1B show the results of the noise detection algorithm from either using the running minimum (FIG. 1A) or the running average (FIG. 1B) as the post-processing stage. Both plots show consistent linear correlation between the input noise level and output results across different video sequences. However the running average gives a better approximation when the noise level is low. Moreover the output lines in the running average graph are more uniformly aligned. This linear correction is consistently held across all standard video testing sequences used. This method may be applied to incoming video signals in a sampling mode, i.e., every $S^{th}$ ($S \geq 1$) frame may be subjected to the noise measurement.

4. Calibration

Finally the output numbers are calibrated to the scale of the corresponding input noise levels. According to tests all video sequences yield the same linear relationship as shown in FIGS. 1A and 1B. Although the output lines don't exactly align with each other, the spread of these lines is thin enough such that one single regression line may be used as an approximation. Thus for all video sequences one linear function may map the noise detection output to the scale of the corresponding input noise level.

Thus the present invention provides a method and apparatus for the detection of Gaussian noise in video signals by decomposing sampled fields/frames into best qualified blocks having low variance and moderate luminance values and enough size, calculating an average standard deviation for the best qualified blocks, temporally filtering the average standard deviation over several fields/frames for smoothing using a running minimum or running average, and calibrating the filtered average standard deviation against a scale of corresponding input noise levels to obtain a measure of the Gaussian noise in the video signals.

What is claimed is:

1. A method of detecting Gaussian noise in a video signal comprising the steps of:

finding best qualified blocks in an image of the video signal that are substantially uniform in luminance;

calculating an average standard deviation for the best qualified blocks;

temporally filtering the average standard deviation over other images of the video signal to obtain a smoothed average standard deviation; and calibrating the smoothed average standard deviation into a scale of corresponding input noise levels to obtain the Gaussian noise in the video signal.

2. The method as recited in claim 1 wherein the finding step comprises the steps of:

subjecting a luminance bit-map of an image to a spatial decomposition to find a significant number of flat blocks; and applying local variance and local luminance criteria to the flat blocks to chose a set of representative flat blocks as the best qualified blocks.

3. The method as recited in claim 2 wherein the finding step further comprises the step of selecting from the representative flat blocks a subset of representative flat blocks as the best qualified blocks.

4. The method as recited in claims 1, 2 or 3 wherein the best qualified blocks have an overall size no smaller than a specified minimum.

* * * * *